2,827,456

PROCESS FOR PURIFICATION OF HECOGENIN

Thomas Eric Holt, Bushey Heath, and John Charles Clayton, West Harrow, England, assignors to Glaxo Laboratories Limited, Greenford, England, a British company No Drawing. Application February 15, 1956
Serial No. 565,549

Claims priority, application Great Britain
February 21, 1955

19 Claims. (Cl. 260—239.55)

This invention is concerned with improvements in or relating to the extraction and further purification of hecogenin from crude materials containing it.

Hecogenin is a steroid which can be obtained from various species of plant material, a particular example of which is the sisal plant; the steroid is useful as a starting material for the synthetic production of various steroids, and especially as a starting material for the synthesis of cortisone and related compounds. The production of hecogenin in bulk and in substantially pure form is therefore of considerable importance, but has been found to present difficulty.

Hecogenin occurs in the sap of the plant in the form of the corresponding saponin and as a first step it is necessary to hydrolyse the glycosidic linkage of the saponin. This may be done in various ways, in one of which, for example, the sap juice is allowed to autolyse, and the resultant slurry hydrolysed with acid.

The product of the hydrolysis of the naturally occurring material is coloured and contains, along with the desired hecogenin, many impurities such as other steroids, waxes, gums and other substances.

This invention has for its object the purification of crude hecogenin derived by the hydrolysis of the corresponding naturally-occurring plant saponins and, for convenience we shall use the term "crude hecogenin" to describe hecogenin-containing material contaminated with impurities normally present following hydrolysis of the naturally-occurring saponin. The crude hecogenin derived directly from the hydrolysis step generally contains up to 30%, and usually between 5–25%, of hecogenin. The present invention is applied directly to the crude hecogenin derived from the hydrolysis of the saponin material.

In copending application No. 524,269 there is described a process for the extraction and purification of hecogenin from crude hecogenin residues, involving principally the extraction of such residues with a hot solvent, preferably certain hydrocarbon solvents as there mentioned; conveniently the residues undergo a preliminary extraction with a cold hydrocarbon solvent in order to extract the waxes. This process whilst very satisfactory has in particular two features which make further improvement desirable. Firstly, the solubility of hecogenin in the solvents, proposed, particularly in hot hydrocarbon solvents, is generally low, thus requiring the use of large quantities of such extraction solvents with attendant difficulties in handling. A further difficulty is that some crude hecogenin residues are in the form of a waxy compressed cake which it is difficult to pulverise satisfactorily; for good results the solvent extraction should clearly be carried out on material in a finely divided state. We have carried out researches to improve still further the extraction and purification of hecogenin from crude hecogenin residues, with the result that we have now developed a novel process which is simple and advantageous.

The principle upon which our present invention is based is that if a crude hecogenin material is dissolved in a lower alcohol (by which we mean an alcohol including from 1–5 carbon atoms) and then caused to crystallise therefrom, a substantial and unexpected degree of purification is achieved. Preferred lower alcohols for the purpose are ethanol and methanol.

In operation our process may be carried out in different ways, in each of which a step of crystallisation from alcohol is always included; with that step we may combine other steps which themselves improve the quality of the material. Thus we may use a step of extracting the crude material, before or after the crystallisation from alcohol, with a cold hydrocarbon solvent to remove waxes; we may also treat the solution of the crude material with charcoal. As stated above, the crude residues still containing waxes, particularly the residues derived directly from the hydrolysis of the naturally-occurring saponin material, are extremely resistant to pulverising and hence are difficult to extract with many solvents; we have found that the use of a lower alcohol solvent for the extraction of crude hecogenin has the advantage of rapidly dispersing the solid throughout the solvent, the hecogenin passing into solution, leaving a suspension which can readily be separated. Even when waxy crude materials which strongly resist pulverising are used, the alcohol quickly breaks these down to a fine powder, which disperses readily throughout the solvent.

The solubility of hecogenin in lower alcohols is relatively high, with the result that smaller quantities are required than, for example, in the process described in the said copending application.

In operation therefore we may take a crude hecogenin material and extract this with the lower alcohol to dissolve the hecogenin present, and separate undissolved impurities from the solution. We may then apply the step of crystallising the hecogenin from this solution, thus securing in one and the same stage the two important advantages of our present invention; the solution may of course also be subjected to a charcoal treatment at this stage.

As an alternative to allowing the hecogenin to crystallise from this first alcohol extraction, the solution may be evaporated to dryness.

The solid material obtained either by crystallisation or by evaporation to dryness may, with advantage, next be extracted with a cold hydrocarbon solvent, particularly an aliphatic hydrocarbon such as light petroleum. This procedure removes waxes. It is of course possible to treat the crude hecogenin with the cold hydrocarbon solvent prior to the alcohol extraction, but—as stated above—the nature of solid crude hecogenin-containing waxes is such as to make extraction with such solvents a matter of some difficulty. It is thus better to take advantage of the breaking-up effect of a lower alcohol upon the crude wax-containing material, before attempting to remove the waxes with the cold hydrocarbon solvent.

Where one has proceeded by extracting the crude hecogenin with a lower alcohol, followed by evaporation to dryness, and subsequent extraction with a cold hydrocarbon solvent, it is then necessary to apply the main principle of the present invention, namely crystallisation from a lower alcohol. This step is not strictly necessary where the material was crystallised from the first alcohol extraction, although in general further purification will often be obtained if an alcohol recrystallisation is applied at this stage even where the first alcohol extraction included a crystallisation step. Where this second treatment with alcohol is used, it may of course include a charcoal treatment although this may not be necessary if the first alcohol extraction included a charcoal treatment.

The hecogenin-containing material derived from the above-mentioned procedures is next conveniently acylated, preferably with an aliphatic acid, for example acetic acid. It is a further feature of our invention to acetylate the material with acetic anhydride, and then crystallise the acetate itself from acetic acid. The step of crystallising the hecogenin acetate from acetic acid introduces further marked purification.

We now give, by way of example only, a general description of preferred ways of carrying out the present invention.

The crude hecogenin residues may be extracted with the lower alcohol solvent either in the hot or cold, but care should be taken to use sufficient solvent to dissolve all the hecogenin present at the temperature of extraction used. We prefer to carry out the extraction in the hot, preferably at the boiling point of the solvent, and to use methanol as the extraction solvent; about 90 volumes of methanol in relation to the total weight of iso-sapogenins is a convenient quantity of solvent. The quantity of isosapogenin in the crude residues may of course be determined by preliminary small scale extraction. The solid residues preferably are thoroughly stirred with the extracting solvent, thus ensuring thorough dispersion of the solid throughout the liquid and hence maximum extraction of the hecogenin present into solution.

The solids in the suspension so obtained can be readily separated by any convenient method, for example by allowing the suspension to settle and decanting the supernatant liquids, by centrifugation or preferably by filtration of the solid from the liquid may be effected in the hot or in the cold, provided that where the extraction of the crude residues is performed in the hot sufficient solvent is used to prevent precipitation of hecogenin from the solution on cooling prior to separation of the solids.

We have found it preferable to treat the alcoholic extract at this stage with decolourising charcoal, as this greatly improves the colour of the extract and renders subsequent operations easier. The treatment with charcoal preferably takes place in the hot, advantageously at the same time as the actual extraction of the crude residues, as the charcoal may then be removed at the same time as the residual solids from the extraction. The quantity of charcoal to be used is best determined by preliminary experiment, but in general terms we prefer to use a quantity of charcoal substantially equal to the quantity of iso-sapogenins present.

The resultant alcoholic extract, freed from solids, contains in solution other iso-sapogenins besides hecogenin, as well as wax-like substances and other impurities, and must therefore be further purified Considerable purification is however achieved by the alcohol extraction, and—particularly where decolourising charcoal has been used—such extracts may have only a relatively light colour.

The next step is to concentrate the alcoholic extract. This is preferably effected by concentrating the extract to a suitable volume, preferably by hot evaporation, from which volume the hecogenin will crystallise. In the case of methanol and where 90 volumes of solvent have been used in the extraction it is convenient to evaporate the extract to about one quarter of its bulk whereupon the crude hecogenin crystallises on cooling and may be separated for example by filtration, further quantities of hecogenin being recovered in the usual way from the mother liquors. The alcoholic extract may of course be evaporated to dryness but the resultant solid is likely to be rather pasty which is less convenient than the crystalline material for treatment in the subsequent stage.

The next stage is to separate the wax-like impurities from the crude hecogenin-containing solids from the alcoholic extracts. This may be conveniently effected by extracting such solids with a cold hydrocarbon solvent, particularly aliphatic hydrocarbon solvents. Light petroleum fractions are very suitable for this step and we have found it convenient to use a fraction boiling within the range of from 100–120° C. The extraction is preferably carried out by stirring the solid with the hydrocarbon solvent in the cold, the quantity of solvent employed being kept small, i. e. just sufficient to extract the wax-like impurities present. The solvent is then removed in any convenient way, preferably by filtration and the residual crude hecogenin preferably washed with further quantities of the solvent. It is to be noted that where in the preceding stage the hecogenin material has been allowed to crystallise and not merely obtained by evaporation of the alcoholic extract to dryness, the leaching with and filtration from the hydrocarbon solvent is easier.

The material resulting from the cold extraction with hydrocarbon solvents varies in purity according to the source from which the original crude hecogenin residues were obtained, but in general such material will contain from 50–85% of hecogenin. Further purification, which is usually desirable where the purity is less than 80%, may be achieved by recrystallisation from a lower alcohol, such as methanol, preferably in the presence of a small quantity, conveniently 5–25% of decolourising charcoal. The resultant recrystallised material generally is from 60–100% pure. This step of recrystallisation is of course essential where the first extract was evaporated to dryness and not caused to crystallise.

In the synthesis of other steroids such as cortisone and the sex hormones it is usual to use as starting material a hecogenin ester, particularly the acetate. We have found that the step of acylating the hecogenin frequently gives rise simultaneously to further purification and thus this step may be regarded as an integral part of a hecogenin purification procedure.

Thus the hecogenin material arising from the previous steps in the present process may be conveniently acylated, preferably with an aliphatic acid, for example acetic acid. Such acylation is preferably carried out using a mixture of the appropriate acid anhydride and the acid itself as acylating agent. Thus, for example, the hecogenin-containing material may be most advantageously acetylated using a mixture of acetic anhydride and acetic acid, preferably in the proportions of 2–3 volumes of acetic acid to 1 volume of acetic anhydride; the use of acetic acid is advantageous in that firstly it tends to prevent hecogenin acetate separating out before the acetylation is complete, and secondly crystallisation can be readily effected by decomposing any excess anhydride to acetic acid by addition of the appropriate quantity of water and allowing the acetate to crystallise from the resulting acetic acid solution. Crystallisation of hecogenin acetate from acetic acid has in general the advantage of removing unwanted steroidal impurities such as other sapogenins as well as residual traces of colour with the result that the product, after washing with water, is suitable for most synthetic purposes.

Further purification may if desired be obtained by recrystallisation of the hecogenin ester from a suitable solvent such as ethyl acetate, acetic acid or light petroleum (preferably a fraction boiling within the range of from 100–120° C.), if necessary in the presence of a small quantity (e. g. about 5%) of charcoal.

It may be found that on some occasions the process hereinbefore described gives a material which is not quite as pure as may be desirable; such material for example will often be of good appearance but may show a melting point somewhat lower than that of pure hecogenin. For example following the crystallisation procedures applied to hecogenin acetate as described above we have recovered such impure material from the mother liquors, which shows a melting point some 10° C. below that of pure hecogenin acetate. The purification of such "sub-standard" material has in our experience given rise to difficulty but we have found that it can be purified by hydrolysing back to hecogenin with a solution of a caustic alkali in a lower alcohol followed For the better understanding of the invention the following examples are given only as illustrations:

Example 1

Sisal residues (Tanganyika) (14 kg.) were refluxed and stirred with methyl alcohol (225 l.) for 1½ hrs. After allowing the suspended solids to settle the clear methanolic extract was decanted. The residual solids were further refluxed and stirred with fresh methanol (225 l.) for one hour. After allowing the suspended solids to settle the methanol extract was again decanted and the combined extracts evaporated to dryness, the last traces of methanol being removed under reduced pressure. The viscous residue was stirred with petrol (18 l. B. P. 100–120° C.) and filtered. The cake was washed with petrol (6 l.) and oven dried at 80° C. The 4.3 kg. of pale green crude hecogenin was heated under reflux for 2 hours with 73 l. methyl alcohol, 1.1 kg. charcoal and 0.5 kg. kieselguhr. The mixture was filtered through a heated stainless steel filter, the residue washed with 6 l. methyl alcohol, and the filtrate and washings allowed to cool. The following day the purified hecogenin was filtered off, washed with 4 l. methanol and dried at 80° C. in an oven to give 1.76 kg. white solid. From the liquors after evaporation to ¼ volume a further 0.5 kg. was obtained.

1.67 kg. of the purified hecogenin were heated with 1.7 l. acetic anhydride and 3.4 l. acetic acid until dissolution was complete and a vigorous reaction commenced. After refluxing for 2 hours, water (226 ml.) was added carefully to destroy excess acetic anhydride and the solution allowed to cool overnight, when the hecogenin acetate crystallised out. It was filtered off and washed with a little acetic acid and then with water. After drying at 100° C. in an oven it amounted to 1.435 kg. of M. P. 243–8° C. From the acetic acid mother liquors on evaporation to ¼ volume a second crop of 125 g. M. P. 237–43° C. was obtained.

Example 2

Sisal residues (Jamaica) (15 kg.) were refluxed and stirred with methanol (80 l.) for one hour. The mixture was cooled to room temperature and filtered through a filter press, the filter cake being washed with methanol (22 l.). The combined filtrate and wash were refluxed with charcoal (2.25 kg.) and kieselguhr (1.6 kg.) for half an hour, the mixture cooled to room temperature and filtered through a filter press, the cake being washed with methanol (22 l.). The combined filtrate and washings were concentrated to 70 l. and allowed to cool. The crystallized product was filtered, washed with methanol (6 l.) and oven dried at 80° C. to give 2.26 kg. The mother liquors were concentrated to 6 l. and allowed to cool and the crystallised product was filtered, washed and dried at 80° C. to give a further 0.89 kg.

2.94 kg. of the resultant crude hecogenin were recrystallised from methyl alcohol (38 l.) with 0.29 kg. charcoal (18%) as in Example 1. A first crop of 1.57 kg. and a second crop of 0.49 kg. were obtained.

1.57 kg. of the purified hecogenin was acetylated as in Example 1 using 1.6 l. acetic anhydride and 3.2 l. acetic acid and at the end of the reaction 212 ml. water was added. The acetate obtained had M. P. 225–235° C. and weighed 1.14 kg. It was purified by dissolution in 44 l. petrol (100/120°) and treated with charcoal (100 g.). The solution was filtered hot and the filtrate allowed to cool. 810 g. hecogenin acetate M. P. 240–6° C. and 98 g. M. P. 229–236° C. were obtained as first and second crops.

Example 3

Sisal residues (Tanganyika) (25 kg.) were refluxed and stirred with methanol (270 l.) and charcoal (3 kg.) for one hour and the mixture filtered hot through a filter press. The filter cake was washed with methanol (22 l.) and the combined filtrate and washings were evaporated to approx. 50 l. and allowed to cool overnight. The crystallised solid was filtered off and washed with methanol (5 l.). The filter cake was slurried with petrol (B. P. 100/120° C.) (15 l.) and filtered and the cake further washed with petrol (5 l.) and dried at 80° C. to give 4.82 kg. buff coloured crude hecogenin.

The methanol mother liquors were concentrated to 7 l. and allowed to cool. The crystalline product was filtered and washed with methanol (2 l.). The filter cake was stirred with petrol (B. P. 100/120° C.) (1 l.), filtered and washed with petrol (200 ml.) and dried at 80° C., 0.26 kg. was obtained.

The crude hecogenin was purified by recrystallisation from methanol and acetylated as in Examples 1 and 2 above.

Example 4

Crude hecogenin acetate (20 g. M. P. 230–235°) recovered from mother liquors from previous experiments was heated under reflux with methanol (450 ml.) and 40% sodium hydroxide (20 mls.) for ½ hour. After cooling the crystalline solid was filtered, washed with a little methanol and dried. It was acetylated by heating under reflux with acetic anhydride (16.5 ml.) and acetic acid (33 ml.) for one hour. The mixture was allowed to cool, the crystalline precipitate filtered off and washed with a little acetic acid and then with water. The dry solid was recrystallised from petrol (560 ml.) using charcoal (0.7 g.: 5%). The hecogenin acetate isolated weighed 9.7 g. and had M. P. 242–6° C.

Example 5

Sisal residues (Tanganyika, 100 g.) were refluxed and stirred with ethanol (800 ml. methylated spirit) for 1 hour. Kieselguhr (30 g.) was added and the solution hot filtered, the filter cake being washed with alcohol (50 ml.). The filter cake was re-extracted with alcohol (800 ml.) for a further 1 hour and the mixture hot filtered. The filter cake was washed with alcohol (50 ml.) and the combined filtrates and washes evaporated to dryness. The viscous residue was slurried with petrol (30 ml. B. P. 100–120°), the crystals washed with petrol (30 ml.) and dried at 100° C. Pale green crude hecogenin (25.9 g.) was obtained of assay 17% sapogenins.

We claim:

1. A process for the purification of crude hecogenin obtained directly from the hydrolysis of the corresponding naturally-occurring plant saponin, comprising contacting said crude hecogenin with an alcohol containing 1–5 carbon atoms and crystallising hecogenin of increased purity from the resulting solution.

2. The process of claim 1 in which said alcohol is methanol.

3. The process of claim 1 in which said alcohol is ethanol.

4. The process of claim 1 in which said crude hecogenin is a wax-containing material including 5–30% hecogenin and wax is extracted in a separate step with a cold hydrocarbon solvent.

5. The process of claim 4 in which said wax is extracted prior to crystallisation from said alcohol.

6. The process of claim 4 in which said wax is extracted after crystallisation from said alcohol.

7. A process for the purification of crude wax-containing hecogenin obtained directly from the hydrolysis of the corresponding naturally-occurring plant saponin, comprising contacting said crude hecogenin with an alcohol containing 1–5 carbon atoms to form a solution containing hecogenin and wax and having solids suspended therein, separating the suspended solids from the solution, evaporating the solution to dryness, extracting wax with a cold hydrocarbon solvent from the resulting dry material, dissolving the remaining wax-free material in an alcohol containing 1–5 carbon atoms and crystallising hecogenin of increased purity from the last-formed solution.

8. The process of claim 7 in which said hydrocarbon solvent is light petroleum.

9. A process for the purification of crude wax-containing hecogenin obtained directly from the hydrolysis of the corresponding naturally-occurring plant saponin, comprising contacting said crude hecogenin with an alcohol containing 1–5 carbon atoms to form a solution containing hecogenin and wax and having solids suspended therein, separating the suspended solids from the solution, concentrating the solution and crystallising hecogenin- and wax-containing material therefrom and extracting wax from said material with a cold hydrocarbon solvent.

10. The process of claim 9 in which said hydrocarbon solvent is light petroleum.

11. The process of claim 9 in which said alcohol is methanol.

12. The process of claim 9 in which said alcohol is ethanol.

13. The process of claim 11 in which the crude hecogenin is dissolved in about 90 volumes of hot methanol in relation to the weight of isosapogenins present in the crude material.

14. The process of claim 9 in which the resulting dewaxed material is recrystallised from its solution in an alcohol containing 1–5 carbon atoms.

15. A process for the purification of crude hecogenin obtained directly from the hydrolysis of the corresponding naturally-occurring plant saponin, comprising contacting said crude hecogenin with an alcohol containing 1–5 carbon atoms, crystallising hecogenin of increased purity from the resulting solution, reacting said hecogenin of increased impurity with acetic anhydride to form hecogenin acetate and crystallising said hecogenin acetate from acetic acid.

16. The process of claim 15 in which the hecogenin of increased purity is acetylated by heating with a mixture of acetic anhydride and acetic acid, sufficient water is added to convert excess acetic anhydride to acetic acid and hecogenin acetate is crystallised from the resulting acetic acid solution thereof.

17. A process for the purification of the waxy, pulverisation-resistant, crude hecogenin obtained directly from the hydrolysis of the corresponding naturally-occurring plant saponin, comprising contacting said crude hecogenin with an alcohol containing 1–5 carbon atoms, whereby said crude hecogenin is quickly broken down to a fine powder which disperses readily throughout the alcohol to give a hecogenin-containing solution having impurities suspended therein.

18. The process of claim 17 in which said alcohol is methanol.

19. The process of claim 17 in which said alcohol is ethanol.

References Cited in the file of this patent
UNITED STATES PATENTS

| | | |
|---|---|---|
| Re. 23,008 | Wagner | June 15, 1948 |
| 2,686,752 | Wall | Aug. 17, 1954 |
| 2,719,843 | Wall | Oct. 4, 1955 |